United States Patent [19]

Richards

[11] Patent Number: 4,799,630
[45] Date of Patent: Jan. 24, 1989

[54] LANDING ATTACHMENT TO AIRCRAFT FOR AMPHIBIOUS LANDING

[76] Inventor: Edward Richards, 616 N. Beachwood Dr., Los Angeles, Calif. 90004

[21] Appl. No.: 143,012

[22] Filed: Jan. 12, 1988

Related U.S. Application Data

[63] Continuation-in-part of Ser. No. 857,297, Apr. 28, 1986, abandoned.

[51] Int. Cl.$^4$ .............................................. B64C 25/66
[52] U.S. Cl. ..................................................... 244/101
[58] Field of Search ................... 244/100 R, 101, 105, 244/106, 107, 108

[56] References Cited

U.S. PATENT DOCUMENTS

| 1,757,918 | 5/1930 | Mulzer. | |
|---|---|---|---|
| 2,670,159 | 2/1954 | Barr | 244/101 |
| 2,711,868 | 6/1955 | Parker. | |
| 2,964,271 | 12/1960 | Strawn | 244/108 |
| 4,027,835 | 6/1977 | Sachs | 244/108 |

FOREIGN PATENT DOCUMENTS

| 2826619 | 12/1979 | Fed. Rep. of Germany. | |
|---|---|---|---|
| 640527 | 7/1928 | France | 244/107 |
| 988784 | 8/1951 | France. | |

*Primary Examiner*—Galen Barefoot
*Assistant Examiner*—Rodney Corl
*Attorney, Agent, or Firm*—Thomas I. Rozsa

[57] ABSTRACT

An emergency landing system for aircraft which includes a pair of landing attachments connected to the underbelly of an aircraft and extending along its length, with each attachment comprising a fairing in the shape of a canoe and landing wheels with each wheel supported on a fixed strut housed within the fairing.

5 Claims, 2 Drawing Sheets

LANDING ATTACHMENT TO AIRCRAFT FOR AMPHIBIOUS LANDING

This is a continuation-in-part of application Ser. No. 06/857,297 filed Apr. 28, 1986 entitled "FLYING SAFETY CANOES," now abandoned.

BACKGROUND OF THE INVENTION

1. Field of the Invention

The present invention relates to a novel attachment to the underbelly of an aircraft to enable the aircraft to land on the surface of water as well as on land. The invention relates to the field of emergecny landing apparatus for aircraft as well as conventional landing apparatus.

2. Description of the Prior Art

Most airplanes (except for seaplanes) are designed to land on airport runways. In situations when the landing gear system fails to operate, for example due to collapsed wheel struts or loss of hydraulic fluid, the pilot must cause the aircraft to execute belly landings. Such emergency belly landings are hazardous, and may lead to human injury as well as damage to the aircraft.

Many types of landing gear apparatus for emergency as well as conventional landing are known in the prior art. Based upon a first Office Action in the parent case, the Applicant is aware of the following prior art references relating to the present invention.

(1) U.S. Pat. No. 2,711,868 issued to Parker in 1955 for "Flotation Device for Aircraft". This invention essentially embodies a multiplicity of buoyant members or floats 16, which are secured at various locations under the wing. This will serve to keep the airplane afloat in the event it is necessary for it to land in water.

(2) U.S. Pat. No. 1,757,918 issued to Mulzer in 1930 for "Aircraft". The relevant portion of this patent involves a "buoyanting" element No. 14 which essentially is a tubular ring around the outside of the aircraft fuselage. The intent of this buoyanting member is to enable the aircraft to remain afloat in the event it is forced to land on water.

(3) French Patent No. 988,784 issued to McCarty Jr. et al. Based on the drawings, it is believed that the patent discloses a type of pneumatic or inflatable stabilizing device beneath the aircraft to enable it to land on earth, water, water with floating ice, snow or ice.

(4) German Offenlegungsschrift No. 28 26 619 published in 1979 by Rainer Zschaubitz for "Emergency Landing Gear For Aircraft". This document discloses the concept of an emergency landing gear, and consists of inflatable bags extending along the length of the fuselage. Until required, the bags, shown as 7 and 8 in the English Abstract, are stowed uninflated in recesses in the fuselage, covered by the explosively removable fairings.

The prior art known to the Applicant and set forth above discloses various types of inflatable devices which applicant believes are impractical. In the case of an emergency landing, the various inflatable devices appear to be unstable and further may burst upon a severe impact with the surface of water or land.

Therefore, a significant need exists for an improved emergency landing apparatus which would permit the aircraft to land on both the surface of water and on a runway or other land surface.

SUMMARY OF THE INVENTION

The present invention relates to a landing attachment to aircraft for amphibious landing comprising a pair of spaced apart landing members located on opposite sides of the underbelly of an aircraft, each landing member comprising (a) an elongated internal fairing member including a horizontal surface and a pair of sidewalls; (b) said horizontal surface of said elongated internal fairing member further comprising a multiplicity of openings spaced apart from each other; (c) a multiplicity of fairing and strut attachment members located along the length of said horizontal surface of said internal fairing and aligned with a respective one of the openings in said horizontal surface; (d) each fairing and strut attachment member receiving and supporting a wheel strut through a respective one opening in the horizontal surface of said internal fairing, with each wheel strut extending transversely within the elongated internal fairing for a portion of the height of the internal fairing sidewalls; (e) each wheel strut affixed to a yoke which in turn supports and carries a landing wheel; (f) an outer fairing enveloping said internal fairing and multiplicity of fairing and strut attachment members; (g) each landing wheel protruding below the lowermost tip of the internal fairing sidewalls and outer fairing for a portion of the landing wheel diameter; and (h) said outer fairing and enclosed internal fairing and multiplicity of fairing and strut attachment members attached to and along the length of one side of the underbelly of an aircraft. The fairing may be in the shape of a canoe. A braking system may be connected to each landing wheel. The landing wheels may be aligned in one row along the central portion of the length of said elongated internal fairing. The elongated internal fairing, each fairing and strut attachment member, each wheel strut, and the outer fairing may be made of metal.

In more general terms, the present invention involves a landing attachment to aircraft for amphibious landing comprising a pair of spaced apart landing members located on opposite sides of the underbelly of an aircraft, each landing member comprising: (a) a fairing in the shape of a canoe attached to the underbelly of the aircraft and extending for a distance along the length of the aircraft; and (b) a multiplicity of landing wheels spaced apart from one another and supported by fixed struts within said fairing, with each landing wheel protruding beneath the fairing for a portion of the diameter of the wheel.

It is an object of the present invention to provide an emergency landing system which would enable the aircraft to land safely on land in the event the normal landing gear fails and further would enable the aircraft to land safely in water in the event of a crisis.

Further novel features and other objects of the present invention will become apparent from the following detailed description, discussion and the appended claims, taken in conjunction with the drawings.

DRAWING SUMMARY

Referring to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

In general concept, the present invention involves an attachment to the underbelly of an aircraft which provides a system to assure that the aircraft will land safely in the event the conventional landing gear fails or in the event the aircraft must make an emergency landing in water. The present invention landing attachment to aircraft for amphibious landing comprises two primary concepts. In the first concept, the attachment includes a multiplicity of fixed wheels which may be small wheels approximately the same size as the wheels on the front landing gear located at the front end of a conventional aircraft. Each wheel is held in its position by a fixed strut of a given length so as to enable all of the wheels to be located at the same distance beneath the aircraft. With the multiplicity of wheels in this fixed position, the risk of landing gear failure is eliminated and the aircraft can always land safely through use of the multiplicity of fixed wheels. The second concept involves creating a housing member which surrounds the wheels to provide an aerodynamic surface in order to reduce drag and further provides a buoyant member to permit the aircraft to land on the surface of water if necessary. Through use of the present invention attachment, the aircraft can always land safely on the ground since the multiplicity of fixed wheels assures that the aircraft will always have wheels on which to land and is not subjected to the risk that the landing gear will not open. Further, the housing member assures that the fixed wheel will create unnecessary drag and further provides a buoyant member to enable the aircraft to land in water without the risk that the buoyant member will be ruptured or deflated in the event of a hard impact on the water surface.

Figure 3:
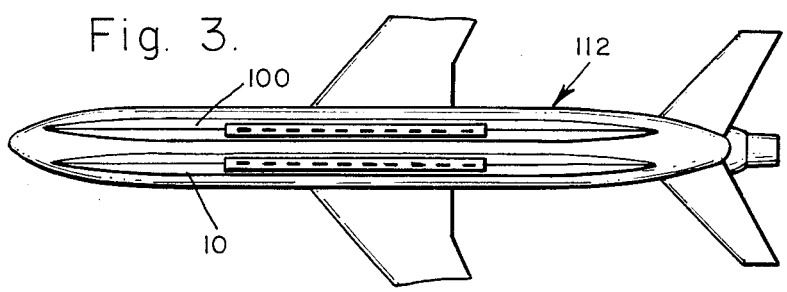
FIG. 3 is a bottom plan view of a jet aircraft showing the present invention landing attachment to aircraft for amphibious landing as it appears installed under the aircraft belly.
Figure 4:
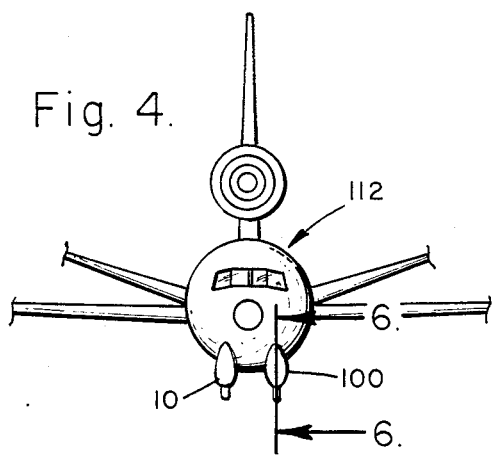
FIG. 4 is a front elevational view of a jet aircraft showing the present invention landing attachment to aircraft for amphibious landing as it appears installed under the aircraft belly.

In the preferred embodiment, a pair of landing attachment apparatus 10 and 100 are attached to the underbelly of an aircraft in spaced apart parallel relationship to one another, as shown in FIGS. 3 and 4. The landing attachment apparatus 100 is a mirror image of the landing attachment apparatus 10 and therefore only landing attachment apparatus 10 will be described in detail.

Figure 8:
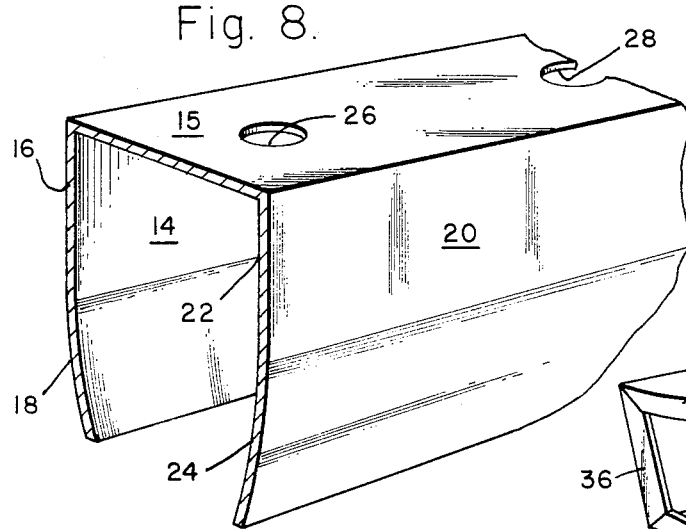
FIG. 8 is a partial perspective view of an internal aerodynamic shaped wheel fairing used with the present invention.
Figure 9:
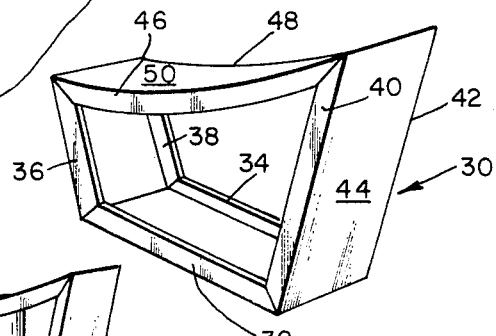
FIG. 9 is a perspective view of a fairing and strut attachment member used to attach the internal aerodynamic shaped wheel fairing and the wheel strut to the underbelly of an aircraft.
Figure 10:
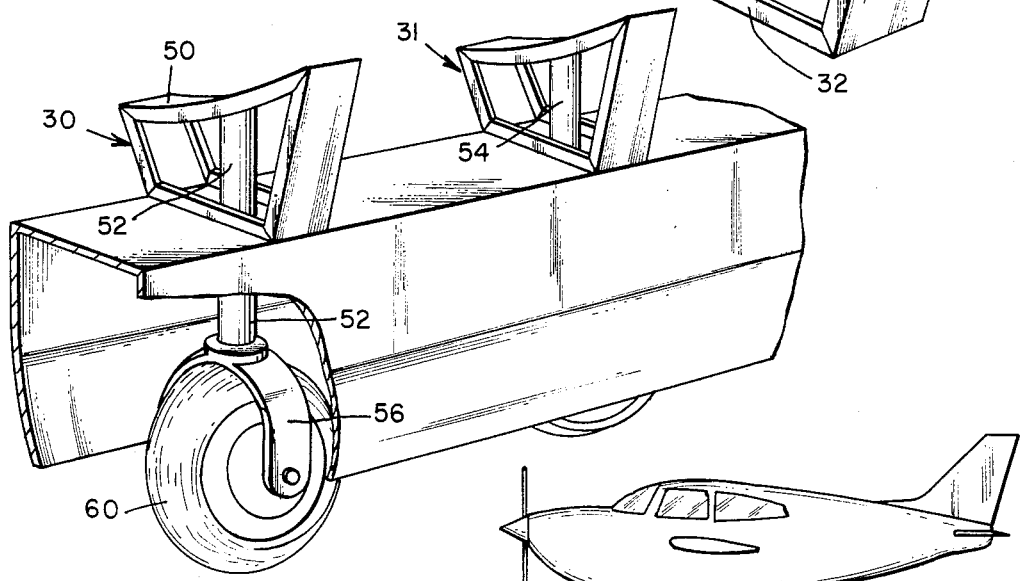
FIG. 10 is a partial perspective view of the assembled internal aerodynamic wheel fairing, fairing and strut attachment member, landing wheel, and wheel strut.
Figure 11:
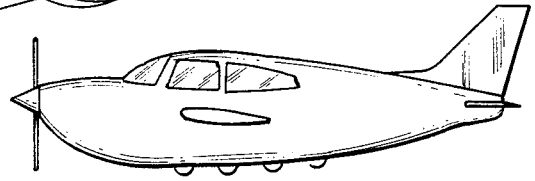
FIG. 11 is a side view of an aircraft in flight showing the present invention landing attachment to aircraft for amphibious landing as it appears installed under the aircraft belly.

Referring to FIG. 8, the landing attachment apparatus 10 comprises an internal fairing housing 12 which includes a generally horizontally disposed upper surface 15 and a pair of sidewalls 14 and 20. Sidewall 14 further comprises a generally straight and vertically disposed upper portion 16 and an arcuate portion 18. Sidewall 20 further comprises a generally straight and vertically disposed upper portion 22 and an arcuate portion 24. Arcuate portions 18 and 24 are curved inwardly and are mirror images of one another. Upper surface 15 further comprises a multiplicity of openings, two of which, 26 and 28 are shown in FIG. 8. Attached to the upper surface 14 and aligned with a respective one of the openings (such as 26 and 28) in the upper surface, are a multiplicity of fairing and strut attachment members. A representative fairing and strut attachment member 30 is illustrated in FIG. 9. The fairing and strut attachment member 30 includes a pair of lower surface attachment members 32 and 34 which are parallel and spaced apart by a given distance such as six inches. Attached at the inner end of the lower surface attachment members are a pair of first sidewall support members 36 and 38 respectively. Attached at the outer end of the lower surface attachment members are a pair of second sidewall support members 40 and 42 respectively. Second sidewall support members 40 and 42 are taller than first sidewall support members 36 and 38. Second sidewall support members 40 and 42 are attached by sidewall surface 44. First sidewall support member 36 is attached to second sidewall support member 40 by first upper surface attachment member 46, and first sidewall support member 38 is attached to second sidewall support member 42 by a comparable second upper surface attachment member. The two upper surface attachment members are attached by an upper surface member 50. Sidewall surface 44 and upper surface 50 serve to enable the members to be spaced apart. The upper surface attachment members (46 and 48) and the upper surface 50 are generally arcuate and intended to conform to the slope of the underbelly of the aircraft. As shown in FIG. 10, a respective strut attachment member 30 (and 31) is placed in alignment with a respective opening in the horizontal surface of the internal fairing 12 such that the lower surface attachment members 32 and 34 rest on and are attached to horizontal surface 15. A multiplicity of wheel struts such as 52 and 54 shown in FIG. 10 are located within the internal fairing 12 and fairing and strut atachment member 30. A given wheel strut such as 52 extends through a given opening 26 and is attached to an upper surface 50 of a fairing and strut support member 30 at its upper end. At its lower end, the wheel strut is attached to a yoke 56 which supports a landing wheel 60.

Figure 6:
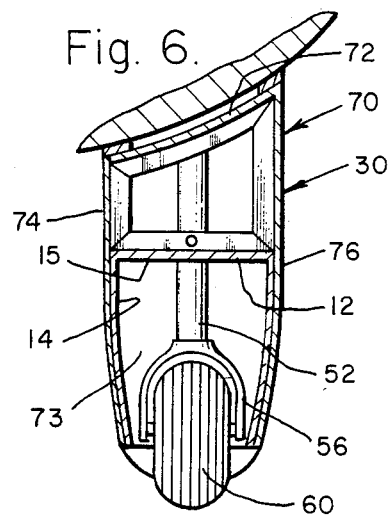
FIG. 6 is a transverse cross-sectional view of the present invention landing attachment to aircraft for amphibious landing showing the structural support members for the landing gear, wheel strut and wheel and the aerodynamic shaped wheel fairing.
Figure 5:
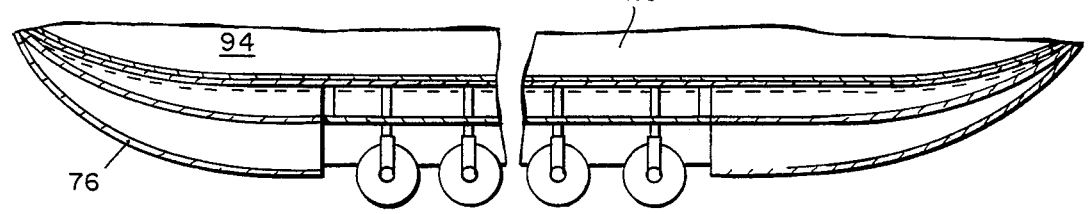
FIG. 5 is a partially cut away cross-sectional view of the present invention landing attachment to aircraft for amphibious landing showing the landing gear and wheel placement within the aerodynamic shaped wheel fairing.
Figure 7:
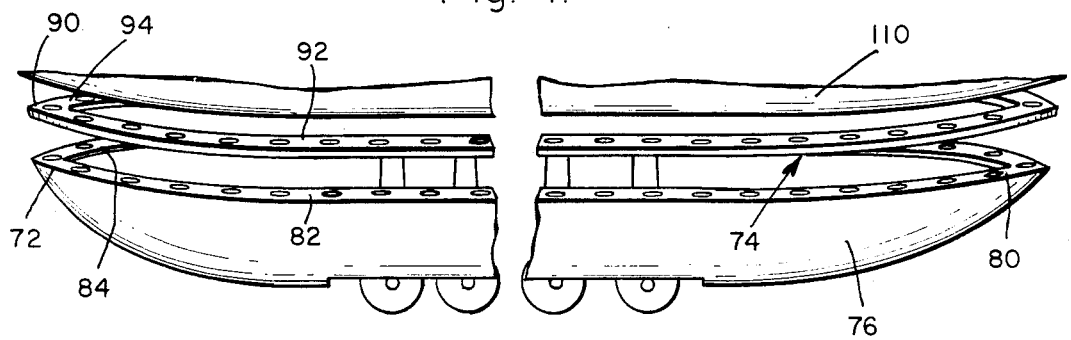
FIG. 7 is an exploded perspective view of the present invention landing attachment to aircraft for amphibious landing showing attachment members between the aerodynamic shaped wheel fairing and the mating members attached to the underbelly of an aircraft.

Referring to FIG. 6, it can be seen that the internal fairing 12 and associated fairing and strut support members such as 30 are housed within an outer shroud or fairing 70 which comprises at upper arcuate surface 72 parallel to upper surface 50 of the fairing and strut support member 30 and a pair of sidewalls 74 and 76 which conform to the shape of the adjacent support member of the fairing and strut support member and sidewall of the internal fairing. As illustrated in FIG. 7, the outer shroud or fairing 70 is generally in the shape of a canoe, with the sidewalls 74 and 76 joining each other at the front and rear end. In this manner, the outer shroud or fairing 70 has an aerodynamic shape to reduce drag. Referring to FIGS. 3 and 5, it can be seen that the multiplicity of landing wheels (such as 60) and associated wheel struts (such as 52) and fairing and strut support members (such as 30) are located in the longitudinal mid area of the outer shroud or fairing 70 so as not to interfere with the sidewalls 74 and 76 joining together to a point at the front and rear ends. In the preferred embodiment, all of the landing wheels and support struts are in one row within the fairing. Referring to FIG. 7, the upper arcuate surface 72 of outer shroud or fairing 70 further comprises a first mating plate 80 which has an arcuate first plate portion 82 and a mirror image arcuate second plate portion 84 conforming to the outside shape of the arcuate surface 72. Attached to the underbelly 110 of the aircraft 112 is a second mating plate 90 which has an arcuate first plate portion 92 and a mirror image arcuate second plate portion 94 parallel to the respective first and second mating plates 82 and 84 and conforming to their respective shapes. The outer shroud or fairing 70 is attached to the underbelly of the aircraft by joining the opposed plate members by means such as riveting. The outer fairing 70 is also attached to the inner fairing 12 and respective fairing and strut support members 30, 32, etc. by attaching opposing and adjacent walls as shown in FIG. 6. In the preferred embodiment, the upper two-thirds of the wheels are located within the fairing structure in order to reduce noise.

Figure 1:
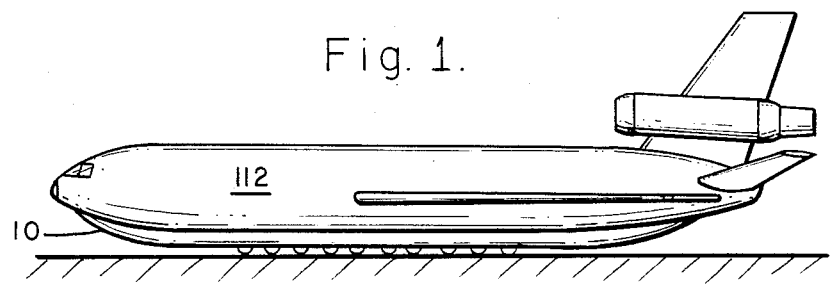
FIG. 1 is a side view of a jet aircraft on the ground, showing the present invention landing attachment to aircraft for amphibious landing as it appears installed under the aircraft belly. The aircraft is resting with the emergency landing gear wheels on the runway.

Referring to FIG. 4, it can be seen that the pair of landing attachment members 10 and 100 are attached to the aircraft 112 in spaced apart parallel relationship. When the regular landing gear does not function and an emergency landing must be made on land, the pilot brings the plane down so as to permit the landing wheels (such as 60) to touch the ground and land the plane, as shown in FIG. 1. It will be appreciated that the normal landing gear and wheels are taller than the attachment apparatus 10 and 100 and therefore the wheels 60 would not touch the ground if the normal landing gear were used.

Figure 2:
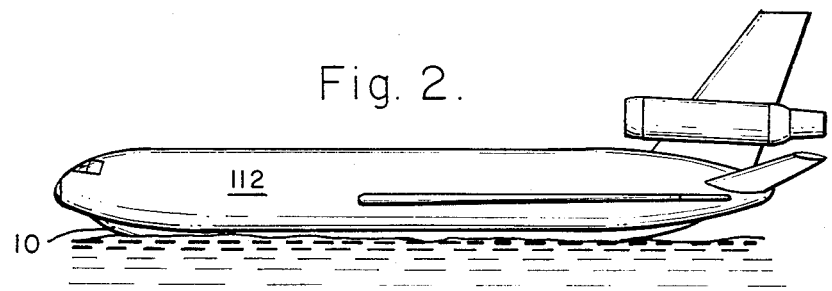
FIG. 2 is a side view of a jet aircraft on the the surface of water, showing the present invention landing attachment to aircraft for amphibious landing as it appears installed under the aircraft belly and supporting the aircraft on the water while displacing some water away from the aircraft.

In the event the aircraft were required to make an emergency landing in the water, the pilot would bring the plane down so that the outer shroud or fairing 70 would touch the surface of the water first to cushion the blow. The water would first fill in inner well 73 created by the area surrounded by walls 14 and 20 and upper surface 15 of the inner fairing 12 and this would serve to create a buoyant effect to help keep the aircraft afloat as well as cushioning the impact of the water. Due to the structural support of the inner fairing 12, fairing and strut support members 30, and outer shroud or fairing 70, the attachment member for emergency landing 10 and 100 will not rupture or deflate such as inflating cushioning members known in the prior art. The aircraft landing in water is shown in FIG. 2. The canoe shaped outer fairings 70 will enable the aircraft to skin along the top of the water and in some cases may allow the aircraft to reach the sand of a nearby beach. The fairings 70 will also assist in preventing the aircraft from sinking upon contact with the water and will provide an opportunity for the aircraft to float.

In an emergency landing, as long as a level attitude is maintained, these emergency landing wheels will protect and help the airplane to avoid landing on its belly on land, and on water or sand. The canoe shaped outer fairings will keep the body from breaking up when it hits the water.

Since the two emergency landing attachment members 10 and 100 are parallel and placed on the underbelly of the aircraft at spaced apart locations at the same arcuate curvature location on opposite sides of the underbelly, the pair of emergency landing attachments 10 and 100 provide balanced weight for the aircraft and further serve to stabilize the aircraft. This safety device can be easily adapted to any size, shape or kind of airplane designed for airport runway landings and will facilitate a smoother and safer emergency landing both on land and on water as well as on sand.

By way of example, the emergency landing attachment parts such as the outer shroud or fairing 70, the inner fairing, the wheel struts 52 and the fairing and strut support members 30 may be made of any suitable sheet metal such as aluminum.

The emergency landing gear wheels (such as 60) may be equipped with a simple independent braking system which could be designed utilizing a conventional hydraulic disk brake or pneumatic disk brake, or brake shoes on drum brakes, or mechanical brakes, operated either by foot pedals or by hand levers. The brakes could be applied either through foot pedals situated near the rudder control, or by a hand grip hand lever positioned on the control stick, acting through a differential unit linked to the rudder pedals. Through the action of the differential linkage, application of the left or right rudder will cause the dual relay valve to increase brake pressure.

There is no intent for this invention to replace conventional aircraft landing gear systems. This new invention is designed as a backup system for emergency landings only. This new invention is intended as a safety device and a safety precaution intended to provide better aircraft transportation in the near future. There is no intent by this new invention to replace existing water landing systems on amphibians and/or other sea planes.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not shown all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A landing attachment to aircraft for amphibious landing comprising a pair of spaced apart landing members located on opposite sides of the underbelly of an aircraft, each landing member comprising:
   a. an elongated internal fairing member including a horizontal surface and a pair of sidewalls;
   b. said horizontal surface of said elongated internal fairing member further comprising a multiplicity of openings spaced apart from each other;
   c. a multiplicity of fairing and strut attachment members located along the length of said horizontal surface of said internal fairing and aligned with a respective one of the openings in said horizontal surface;
   d. each fairing and strut attachment member receiving and supporting a wheel strut through a respective one opening in the horizontal surface of said internal fairing, with each wheel strut extending transversely within the elongated internal fairing for a portion of the height of the internal fairing sidewalls;
   e. each wheel strut affixed to a yoke which in turn supports and carries a landing wheel;
   f. an outer fairing enveloping said internal fairing and multiplicity of fairing and strut attachment members;
   g. each landing wheel protruding below the lowermost tip of the internal fairing sidewalls and outer fairing for a portion of the landing wheel diameter; and
   h. said outer fairing and enclosed internal fairing and multiplicity of fairing and strut attachment members attached to and along the length of one side of the underbelly of an aircraft.

2. The invention in accordance with claim 1, wherein said outer fairing is in the shape of a canoe.

3. The invention in accordance with claim 1, further comprising a braking system connected to each landing wheel.

4. The invention in accordance with claim 1, wherein said landing wheels are aligned in one row along the central portion of the length of said elongated internal fairing.

5. The invention in accordance with claim 1, wherein said elongated internal fairing, each said fairing and strut attachment member, each said wheel strut, and said outer fairing are made of metal.

* * * * *